United States Patent
Kim et al.

(10) Patent No.: US 11,286,374 B2
(45) Date of Patent: Mar. 29, 2022

(54) POLYARYLENE SULFIDE RESIN COMPOSITION FOR AUTOMOBILE HEADLAMP COMPONENT AND AUTOMOBILE HEADLAMP COMPONENT MANUFACTURED USING THE SAME

(71) Applicants: Hyundai Mobis Co., Ltd., Seoul (KR); SK Chemicals Co., Ltd., Seongnam-si (KR)

(72) Inventors: Jong Su Kim, Yongin-si (KR); Seung Yeon Lee, Yongin-si (KR); Jung Hwan Lee, Yongin-si (KR); Ya Won Kim, Yongin-si (KR); Hyeong Geun Oh, Seongnam-si (KR); Jong Wook Shin, Seongnam-si (KR); Se Ran Choi, Seongnam-si (KR)

(73) Assignees: Hyundai Mobis Co., Ltd., Seoul (KR); HDC Polyall Co., Ltd., Ulsan (KR)

( * ) Notice: Subject to any disclaimer, the term of this patent is extended or adjusted under 35 U.S.C. 154(b) by 0 days.

(21) Appl. No.: 16/792,744

(22) Filed: Feb. 17, 2020

(65) Prior Publication Data
US 2020/0263003 A1    Aug. 20, 2020

(30) Foreign Application Priority Data
Feb. 18, 2019    (KR) .................. 10-2019-0018332

(51) Int. Cl.
| C08K 13/04 | (2006.01) |
| B60Q 1/04 | (2006.01) |
| C08K 3/20 | (2006.01) |
| C08K 5/00 | (2006.01) |
| C08K 7/02 | (2006.01) |
| C08G 75/0268 | (2016.01) |

(52) U.S. Cl.
CPC .............. *C08K 13/04* (2013.01); *B60Q 1/04* (2013.01); *C08K 3/20* (2013.01); *C08K 5/0083* (2013.01); *C08K 7/02* (2013.01); *C08G 75/0268* (2013.01)

(58) Field of Classification Search
CPC . C08K 13/04; C08K 3/13; C08K 3/02; C08K 3/10; C08K 3/20; C08K 3/38; C08K 5/0083; C08K 7/02; C08K 2201/003; C08K 2201/004; C08K 2201/014; C08L 81/04; C08L 2666/55; C08L 2666/72; C08G 75/00; C08G 75/0268; C08G 75/0286; B60Q 1/04
See application file for complete search history.

(56) References Cited

U.S. PATENT DOCUMENTS

| 5,256,715 A * | 10/1993 | Harry ................... C08K 5/5406 524/188 |
| 5,578,659 A * | 11/1996 | Anada ...................... C08K 9/06 523/212 |
| 8,044,126 B2 * | 10/2011 | Yoshino .................. C08L 81/02 524/123 |
| 8,357,737 B2 * | 1/2013 | Tanaka ..................... C08K 7/06 524/277 |
| 2002/0161089 A1 * | 10/2002 | Nagatoshi .............. C08K 5/098 524/394 |
| 2009/0181234 A1 * | 7/2009 | Yoshino .................. C08L 77/00 428/304.4 |
| 2010/0331463 A1 * | 12/2010 | Yoshino .................. C08L 81/02 524/132 |
| 2016/0168357 A1 * | 6/2016 | Kamplain .......... C08G 75/0281 264/328.14 |
| 2018/0215918 A1 * | 8/2018 | Tomoda ................. H05K 9/009 |
| 2018/0265701 A1 * | 9/2018 | Tomoda .................. C08J 5/046 |
| 2019/0144609 A1 * | 5/2019 | Kim ........................ C08K 3/22 524/262 |
| 2019/0309164 A1 * | 10/2019 | Takamoto ............... C08L 67/02 |

FOREIGN PATENT DOCUMENTS

| JP | 09302228 A | * | 11/1997 | ............. C08K 3/00 |
| JP | 2002167509 A | * | 6/2002 | ............. C08L 81/02 |
| WO | WO 2016121894 A1 | * | 8/2016 | ............. C08G 75/02 |
| WO | WO 2017200203 A1 | * | 11/2017 | ............. C08K 7/14 |

OTHER PUBLICATIONS

WIPO Machine translation of JP 1997302228 B2, to Anada et al. published Nov. 1997; (B2 granted patent equivalent of JP 09302228 A published pre-grant application) (Year: 1997).*
WIPO Machine translation of JP 2002167509 A to Nakagawa et al. published Jun. 2002 (Year: 2002).*

* cited by examiner

*Primary Examiner* — Jane L Stanley
(74) *Attorney, Agent, or Firm* — H.C. Park & Associates, PLC

(57) ABSTRACT

The present disclosure relates to a polyarylene sulfide resin composition for an automobile headlamp component, a method for producing the same, and an automobile headlamp component manufactured using the same. The polyarylene sulfide resin composition includes: about 45 wt % to about 75 wt % of a polyarylene sulfide resin containing about 300 ppm or less of chlorine; about 24.5 wt % to about 55 wt % of an inorganic filler; about 0.1 wt % to about 1 wt % of a nucleating agent; about 0.05 wt % to about 1 wt % of metal powder; and about 0.1 wt % to about 2.5 wt % of a composite metal hydroxide.

20 Claims, 1 Drawing Sheet

(a) Example 1

(b) Comparative Example 6

POLYARYLENE SULFIDE RESIN COMPOSITION FOR AUTOMOBILE HEADLAMP COMPONENT AND AUTOMOBILE HEADLAMP COMPONENT MANUFACTURED USING THE SAME

CROSS-REFERENCE TO RELATED APPLICATION

This application claims priority from and the benefit of Korean Patent Application No. 10-2019-0018332, filed on Feb. 18, 2019, which is hereby incorporated by reference for all purposes as if fully set forth herein.

BACKGROUND

Field

Exemplary embodiments of the present disclosure relate to a polyarylene sulfide resin composition for an automobile headlamp component and an automobile headlamp component manufactured using the same.

Discussion of the Background

A base plate of an automobile headlamp having both high and low beams which are aimed, and is mounted with all components associated with a reflector.

Polyarylene sulfide (PAS) is a representative engineering plastic and the demand for use of the PAS in various products or electronic goods, which are used in high temperature and corrosive environments, is increasing due to its high heat resistance, chemical resistance, flame resistance and electrical insulation properties. Among such polyarylene sulfides, polyphenylene sulfide (PPS) is widely used as an automobile component such as the above-described base plate, or a housing or main component for an electrical/electronic device, due to its excellent mechanical, electrical and thermal properties and chemical resistance.

However, although conventional PPS has excellent mechanical and thermal properties, a problem arises in that the conventional PPS generates outgas in a high-temperature environment such as an automobile headlamp, causing haze in the product.

Meanwhile, in order to improve durability in a high-temperature environment, such as preventing haze from occurring inside the outer lens when the headlamp including the base plate made of the PPS material is exposed to a high-temperature environment, a heat dissipation structure is applied or a process of eliminating unnecessary extra components is performed. In this case, problems arise in that the production cost increases, resulting in lower economic efficiency, and design freedom decreases.

The above information disclosed in this Background section is only for enhancement of understanding of the background of the invention and, therefore, it may contain information that does not constitute prior art.

SUMMARY OF THE INVENTION

Exemplary embodiments of the present invention provide a polyarylene sulfide resin composition for an automobile headlamp component, which may minimize the generation of outgas in a high-temperature environment.

Another object of the present disclosure is to provide a polyarylene sulfide resin composition for an automobile headlamp component having excellent miscibility and moldability.

Still another object of the present disclosure is to provide a polyarylene sulfide resin composition for an automobile headlamp component having excellent rigidity, heat resistance and reliability.

Yet another object of the present disclosure is to provide an automobile headlamp component manufactured using the polyarylene sulfide resin composition.

One aspect of the present disclosure is directed to a polyarylene sulfide resin composition for an automobile headlamp component. The polyarylene sulfide resin composition includes: about 45 wt % to about 75 wt % of a polyarylene sulfide resin containing about 300 ppm or less of chlorine; about 24.5 wt % to about 55 wt % of an inorganic filler; about 0.1 wt % to about 1 wt % of a nucleating agent; about 0.05 wt % to about 1 wt % of metal powder; and about 0.1 wt % to about 2.5 wt % of a composite metal hydroxide.

In one embodiment, the polyarylene sulfide resin may be produced by a method including: subjecting reactants including a diiodo aromatic compound and a sulfur compound to a polymerization reaction; and adding a polymerization stopping agent to the reactants at a time point where about 70 wt % or more of the diiodo aromatic compound of the reactants has reacted during the polymerization.

In one embodiment, the polymerization reaction may be performed under the initial reaction conditions of temperature of about 180° C. to about 250° C. and pressure of about 50 torr to about 450 torr, and then under the final reaction conditions of temperature of about 270° C. to about 350° C. and pressure of about 0.001 torr to about 20 torr, which are reached by performing temperature rise and pressure drop from the initial reaction conditions.

In one embodiment, the polyarylene sulfide resin may have a melting point of about 265° C. to about 290° C., a number-average molecular weight of about 5,000 to about 50,000, and a melt viscosity of about 10 poise to about 50,000 poise, as measured with a rotating disk viscometer at 300° C.

In one embodiment, the polyarylene sulfide resin may contain about 10 ppm to about 10,000 ppm of one or more of iodine coupled to the main chain of the resin and free iodine.

In one embodiment, the inorganic filler may be in the form of fibers having an average diameter of about 6 μm to about 15 μm and an average length of about 2 mm to about 5 mm.

In one embodiment, the nucleating agent may include one or more of borate, boron sulfide ($B_2S_3$), boron chloride ($BCl_3$), boric acid ($H_3BO_3$), colemanite, zinc borate compounds, boron carbide ($B_4C$), boron nitride (BN), and boron oxide ($B_2O_3$).

In one embodiment, the metal powder may include one or more of copper (Cu), nickel (Ni), titanium (Ti), palladium (Pd), chromium (Cr), gold (Au), zinc (Zn), iron (Fe), molybdenum (Mo), cobalt (Co), silver (Ag) and platinum (Pt).

In one embodiment, the composite metal hydroxide may include hydrotalcite.

In one embodiment, the polyarylene sulfide resin composition may further include, based on the total weight of the composition, about 0.1 wt % to about 5 wt % of a compatibilizer.

In one embodiment, the polyarylene sulfide resin composition may include the metal powder and the composite metal hydroxide at a weight ratio of about 1:1 to about 1:2.5.

In one embodiment, the polyarylene sulfide resin composition may have a heat distortion temperature (1.82 MPa, 120° C./hr) of about 260° C. or above as measured in accordance with ASTM D 648, an Izod impact strength of about 69 J/m or higher as measured for a 3.2 mm-thick specimen in accordance with ASTM D 256, and a haze of about 5% or less as measured on a glass plate after performing a fogging test for pellets (15 g) of the polyarylene sulfide resin composition at 230° C. for 5 hours.

In one embodiment, the polyarylene sulfide resin composition may have a tensile strength of about 165 MPa or higher as measured in accordance with ASTM D 638, a flexural strength of about 230 MPa or higher as measured in accordance with ASTM D 740, and a flexural modulus of about 11,500 MPa or higher as measured in accordance with ASTM D 740.

Another aspect of the present disclosure is directed to an automobile headlamp component manufactured using the polyarylene sulfide resin composition.

In one embodiment, the automobile headlamp component may include a base plate.

The polyarylene sulfide resin composition and the automobile headlamp component manufactured using the same according to the present disclosure may minimize the generation of outgas in a high-temperature environment. Further, the polyarylene sulfide resin composition may have excellent miscibility, moldability, heat resistance and reliability, and thus may be suitable for use as an automobile headlamp component, such as a base plate for a headlamp aiming device.

It is to be understood that both the foregoing general description and the following detailed description are exemplary and explanatory and are intended to provide further explanation of the invention as claimed

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
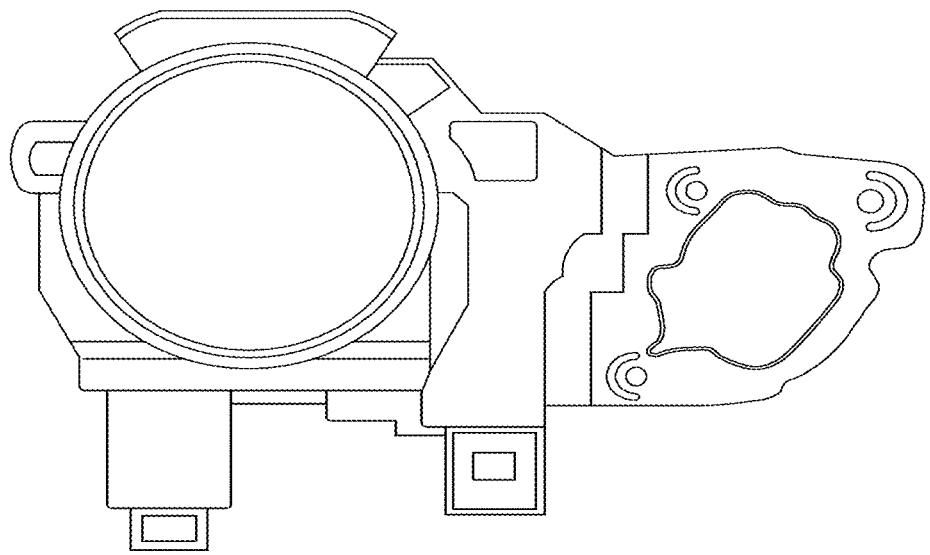
FIG. 1 illustrates an automobile headlamp component manufactured according to one embodiment of the present disclosure.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

In the following description, the detailed description of related publicly-known technology or configuration will be omitted when it may unnecessarily obscure the subject matter of the present disclosure.

In addition, the terms used in the following description are terms defined taking into consideration the functions obtained in accordance with embodiments of the present disclosure, and may be changed in accordance with the option of a user or operator or a usual practice. Accordingly, the definition of the terms should be made based on the contents throughout the specification.

Polyarylene Sulfide Resin Composition for Automobile Headlamp Component

One aspect of the present disclosure is directed to a polyarylene sulfide resin composition for an automobile headlamp component. In embodiments, the polyarylene sulfide resin composition includes: about 45 wt % to about 75 wt % of a polyarylene sulfide resin containing 10000 ppm or less of iodine and about 300 ppm or less of chlorine; about 24.5 wt % to about 55 wt % of an inorganic filler; about 0.1 wt % to about 1 wt % of a nucleating agent; about 0.05 wt % to about 1 wt % of metal powder; and about 0.1 wt % to about 2.5 wt % of a composite metal hydroxide.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereinafter, the components of the polyarylene sulfide resin composition will be described in more detail.

Polyarylene Sulfide Resin

The polyarylene sulfide resin contains about 300 ppm or less of chlorine. At this chlorine content, the generation of outgas from the polyarylene sulfide resin composition in a high-temperature environment may be minimized. For example, the polyarylene sulfide resin contains about 0 ppm to about 300 ppm of chlorine.

In embodiments, the polyarylene sulfide resin of the present disclosure is subjected to a drying process under elevated temperature and reduced pressure in a reactor, which may be charged with nitrogen and in which a vacuum may be formed, in order to suppress the generation of outgas and haze in a headlamp component environment. Pre-drying may be performed at a temperature of about 200° C. to about 280° C., which is equal to or lower than a first melting point (tm). Through the pre-drying process, oligomeric byproducts may be removed, thereby primarily eliminating a contaminant (outgas) that may be generated at room temperature or in a high-temperature environment. The resulting heated pellet-type chip may be transferred into a second reactor vessel, and then a secondary process may be performed in a vacuum state. This enables the secondary drying of the base resin and complete elimination of a contaminant (haze) through a residence process in a high-temperature and high-pressure environment for a predetermined period of time. In addition, the final product may further be subjected to a compounding process of adding an inorganic additive and other functional additives. In this compounding process, a contaminant may additionally be introduced into or generated in the compounding process by the inorganic filler or functional additives. However, as described below with respect to this additionally generated outgas component or contaminant, it was additionally confirmed that the application of a specific inorganic additive had the effect of reducing outgas. In addition, it can be seen that the polyarylene sulfide resin composition of the present disclosure has an excellent effect of reducing haze while maintaining mechanical properties and reliability characteristics, compared to a conventional polyarylene sulfide resin composition.

The polyarylene sulfide resin of the present disclosure may be produced by melt-polymerizing reactants including a diiodo aromatic compound and a sulfur element, in order to limit the content of sodium or chlorine as described above. The polyarylene sulfide resin produced by the melt-polymerization process as described above has a sodium or chlorine content which is theoretically close to 0 ppm, since a raw material containing sodium or chlorine is not used for producing the polyarylene sulfide resin. However, a trace amount of sodium or chlorine may be incorporated by impurities in post-processing processes such as extrusion and injection molding.

In one embodiment, the polyarylene sulfide resin may be produced by a method including: subjecting reactants including a diiodo aromatic compound and a sulfur compound to a polymerization reaction; and adding a polymerization stopping agent to the reactants at a time point where about 70% or more of the diiodo aromatic compound of the reactants has reacted during the polymerization. The polyarylene sulfide resin produced as described above rarely contains by-products in a salt form or low-molecular weight by-products, unlike polyarylene sulfide resins produced by conventional production processes.

In one embodiment, the polymerization reaction may be performed in a reactor equipped with a thermocouple, which is capable of measuring the internal temperature of the reactor, and a vacuum line through which nitrogen may be charged and a vacuum may be applied.

In one embodiment, the content of each of the diiodo aromatic compound and the sulfur compound may be determined considering the molecular weight of the polyarylene sulfide resin to be produced by polymerization. For example, 100 parts by weight of the diiodo aromatic compound and about 5 parts by weight to about 50 parts by weight of the sulfur compound may be reacted to form reactants. Under these conditions, the efficiency of the reaction may be excellent.

In one embodiment, the diiodo aromatic compound may include, but is not limited to, one or more of diiodobenzene (DIB), diiodonaphthalene, diiodobiphenyl, diiodobisphenol, and diiodobenzophenone.

For example, the diiodo aromatic compound may be substituted with an alkyl group and a sulfone group, or a diiodo aromatic compound in which elements such as oxygen and nitrogen are contained in an aromatic group may also be used. In addition, the diiodo aromatic compound includes a variety of diiodo compound isomers depending on the bonding position of the iodine atom, and among these isomers, a compound containing iodine bonded to the para position is more preferable, such as para-diiodobenzene (pDIB), 2,6-diiodonaphthalene, or p,p'-diiodobiphenyl.

The sulfur compound may contain a sulfur element. The sulfur element is present in the form of a ring containing eight connected sulfur atoms (cyclooctasulfur; $S_8$) at room temperature. In addition to this form, any commercially available sulfur compound may also be used without particular limitation as long as it is a solid- or liquid-state sulfur compound.

In addition, the reactants including the diiodo aromatic compound and the sulfur compound may further include one or more of a polymerization initiator and a stabilizer. In embodiments, the polymerization initiator may include, but is not limited to, one or more of 1,3-diiodo-4-nitrobenzene, mercaptobenzothiazole, 2,2'-dithiobenzothiazole, cyclohexylbenzothiazole sulfenamide and butylbenzothiazole sulfenamide. The stabilizer is not particularly limited as long as it is a stabilizer that is used in a conventional resin polymerization reaction.

Meanwhile, the time point of adding the polymerization stopping agent may be determined considering the molecular weight of the polyarylene sulfide resin to be produced by polymerization. For example, the polymerization stopping agent may be added at a time point where about 70 wt % to about 100 wt % of the diiodo aromatic compound included in the initial reactants has been exhausted by reaction.

In one embodiment, the melt-polymerization may be performed under the initial reaction conditions of temperature of about 180° C. to about 250° C. and pressure of about 50 torr to about 450 torr, and then under the final reaction conditions of temperature of about 270° C. to about 350° C. and pressure of about 0.001 torr to about 20 torr, which are reached by performing temperature rise and pressure drop from the initial reaction conditions.

In addition, the melt-polymerization may be performed for about 1 hour to about 30 hours. For example, the melt-polymerization may be performed under the final reaction conditions of temperature of about 280° C. to about 300° C. and pressure of about 0.1 torr to about 0.5 torr. Under these conditions, the polymerization of the reactants may be easily performed.

The polymerization stopping agent is not particularly limited as long as it is a compound capable of stopping the polymerization by eliminating an iodo group that is incorporated into the polyarylene sulfide resin during the polymerization. In one embodiment, the polymerization stopping agent may include one or more of diphenyls, benzophenones, monoiodoaryls, benzothiazoles, benzothiazole sulfenamides, thiurams and dithiocarbamates. More specifically, the polymerization stopping agent may include one or more of diphenyl sulfide, diphenyl ether, dibenzothiazole disulfide, iodobiphenyl, iodophenol, iodoaniline, iodobenzophenone, 2-mercaptobenzothiazole, 2,2'-dithiobisbenzothiazole, N-cyclohexylbenzothiazole-2-sulfenamide, 2-morpholinothiobenzothiazole, N,N-dicyclohexylbenzothiazole-2-sulfenamide, tetramethylthiuram monosulfide, tetramethylthiuram disulfide, zinc dimethyldithiocarbamate, zinc diethyldithiocarbamate, and diphenyl disulfide.

In one embodiment, before the melt-polymerization step, a step of melt-mixing the reactants including the diiodo aromatic compound and the sulfur compound may further be included. Conditions for this melt-mixing are not particularly limited as long as they are conditions where the reactants may be melt-mixed. For example, the melt-mixing may be performed at a temperature of about 130° C. to about 200° C. In another example, the melt-mixing may be performed at a temperature of about 160° C. to about 190° C. When the melt-mixing step is performed before the melt-polymerization, the subsequent melt-polymerization may be more easily performed.

In one embodiment, the melt-polymerization may be performed in the presence of a nitrobenzene-based catalyst. For example, when the melt-mixing step is performed before the melt-polymerization reaction, the nitrobenzene-based catalyst may be added in the melt-mixing step. For example, the nitrobenzene-based catalyst may include, but is not limited to, 1,3-diiodo-4-nitrobenzene, or 1-iodo-4-nitrobenzene.

The produced polyarylene sulfide resin may include one or more of iodine coupled to the main chain of the resin and free iodine. In one embodiment, the "free iodine" refers collectively to iodine molecules, iodine ions or iodine radicals, which remain chemically separated from the finally produced polyarylene sulfide resin. In one embodiment, the free iodine may be generated during the polymerization of the reactants including the diiodo aromatic compound and the sulfur compound.

For example, the polyarylene sulfide resin may contain about 10 ppm to about 10,000 ppm of one or more of iodine coupled to the main chain of the resin and free iodine. More specifically, the polyarylene sulfide resin may contain about 10 ppm to about 5,000 ppm of one or more of iodine coupled to the main chain of the resin and free iodine.

In one embodiment, the content of iodine coupled to the main chain of the polyarylene sulfide resin and free iodine may be measured by quantification with ion chromatography after heat-treating the polyarylene sulfide resin at high temperature.

Meanwhile, the generation of outgas from a conventional polyarylene sulfide resin tends to increase with increasing temperature, but the polyarylene sulfide resin of the present disclosure rarely contains low-molecular-weight byproducts, unlike those produced by conventional production processes.

The polyarylene sulfide resin produced by the present disclosure may have an outgas value about $60 \times 10^6$ or less, specifically about $30 \times 10^6$ or less, which is at least 6-fold lower than that of a polyarylene sulfide resin produced by a conventional polymerization method, when determined by a GC/MS ATD method, more specifically a 150° C. ATD relative method. In addition, it has an outgas content of about 3,000 ppm or less.

In one embodiment, the polyarylene sulfide resin may have a number-average molecular weight of about 5,000 to about 50,000, for example, about 8,000 to about 40,000, and as another example, about 10,000 to about 30,000. In addition, the polyarylene sulfide resin may have a dispersity index of about 2.0 to about 4.5, for example, about 2.0 to about 4.0, and as another example, about 2.0 to about 3.5, as defined by the weight-average molecular weight relative to the number-average molecular weight of the polyarylene sulfide resin. Under these conditions, the mechanical properties of the composition of the present disclosure may be excellent.

In one embodiment, the polyarylene sulfide resin may have a melt viscosity of about 10 poise to about 50,000 poise, for example, about 100 poise to about 20,000 poise, and as another example, about 300 poise to about 10,000 poise, as measured by a rotating disk viscometer at 300° C. Under these conditions, the processability and mechanical properties of the composition may be excellent.

In one embodiment, the polyarylene sulfide resin may have a melting point of about 265° C. to about 290° C., for example, about 270° C. to about 285° C., and as another example, about 275° C. to about 283° C. Under these conditions, the processability and mechanical properties of the composition may be excellent.

In one embodiment, the polyarylene sulfide resin is included in an amount of about 45 wt % to about 75 wt % based on the total weight of the polyarylene sulfide resin composition. If the polyarylene sulfide resin is included in an amount of less than about 45 wt %, the mechanical strength of the composition of the present disclosure may be reduced, and if the polyarylene sulfide resin is included in an amount of more than about 75 wt %, a problem associated with heat resistance properties may be caused. For example, the polyarylene sulfide resin may be included in an amount of about 50 wt % to about 70 wt %. As another example, the polyarylene sulfide resin may be included in an amount of about 55 wt % to about 65 wt %. For example, the polyarylene sulfide resin may be included in an amount of about 45, 46, 47, 48, 49, 50, 51, 52, 53, 54, 55, 56, 57, 58, 59, 60, 61, 62, 63, 64, 65, 66, 67, 68, 69, 70, 71, 72, 73, 74 or 75 wt %.

Inorganic Filler

The inorganic filler improves the heat resistance and mechanical strength of the polyarylene sulfide resin composition. In one embodiment, the inorganic filler may include a fibrous inorganic filler. In one embodiment, the fibrous inorganic filler may include one or more of glass fiber, carbon fiber, silica fiber, potassium titanate fiber, titanium fiber, aramid fiber, and asbestos fiber. Specifically, the fibrous inorganic filler may be glass fiber. For example, the fibrous inorganic filler may be alumino-borosilicate glass fiber.

In one embodiment, the inorganic filler may be in the form of fibers having an average diameter of about 6 μm to about 15 μm and an average length of about 2 mm to about 5 mm. Under these conditions, the composition may have excellent miscibility, moldability and mechanical strength. For example, the inorganic filler may be in the form of fibers having an average diameter of about 6 μm to about 13 μm, for example, about 9 μm to about 12 μm, and an average length of about 3 mm to about 5 mm.

In one embodiment, a surface-treated inorganic filler may be used as the inorganic filler. For example, the inorganic filler may include surface-treated glass fiber as a fibrous inorganic filler. When the surface-treated glass fiber is used, the interfacial bonding strength between the polyarylene sulfide resin and the glass fiber may be improved. In one embodiment, the inorganic filler may be surface-treated with one or more of aminosilanes, epoxy-based silanes and urethane silanes.

In one embodiment, the inorganic filler is included in an amount of about 24.5 wt % to about 55 wt % based on the total weight of the polyarylene sulfide resin composition. If the inorganic filler is included in an amount of less than about 24.5 wt %, the effect of adding the inorganic filler may be insignificant, and if the inorganic filler is included in an amount of more than about 55 wt %, the processability of the polyarylene sulfide resin composition may be reduced. For example, the inorganic filler may be included in an amount of about 30 wt % to about 50 wt %. As another example, the inorganic filler may be included in an amount of about 35 wt % to about 45 wt %. For example, the inorganic filler may be included in an amount of about 24.5, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54 or 55 wt %.

Nucleating Agent

The nucleating agent promotes crystal growth and increases crystallization rate. The nucleating agent may include an inorganic nucleating agent. The inorganic nucleating agent serves as a primary crystal nucleus of a crystalline polymer, which promotes the crystal growth, refines the crystal size and increases the crystallization rate.

As the resin composition of the present disclosure includes the inorganic nucleating agent, the crystallization rate may be increased, thereby decreasing the cycle time during injection molding, and increasing the degree of crystallization even in a mold at low temperature. In particular, the surface characteristics of a product produced using polyarylene sulfide resin greatly change depending on the temperature of a mold during injection molding. In general, if injection molding is performed at a mold temperature of 130° C. or below, surface defects such as protrusions of the filler occur on the outer surface of the product. However, when the resin composition includes the nucleating agent, the nucleating agent has the effect of increasing the crystallization rate of the resin composition even when the mold temperature is low, thereby greatly improving the appearance quality of the molded product.

In one embodiment, the nucleating agent may include one or more of boron sulfide ($B_2S_3$), boron chloride ($BCl_3$), boric acid ($H_3BO_3$), colemanite ($Ca_2B_6O_{11}.5H_2O$), zinc borate compounds, boron carbide ($B_4C$), boron nitride (BN), and boron oxide ($B_2O_3$).

Specifically, the nucleating agent may include one or more of boron nitride (BN) and boron oxide ($B_2O_3$). For example, the nucleating agent may include about 5 wt % or less or about 0.5 wt % or less of boron oxide ($B_2O_3$) and about 95 wt % or more of boron nitride (BN). In another example, the nucleating agent may include about 0.01 wt % to about 0.5 wt % of boron oxide ($B_2O_3$) and about 99.5 wt % to 99.99 wt % of boron nitride (BN). The zinc borate compound may include one or more of $Zn_2O_{14}.5H_7B_6$, $Zn_4O_8B_2H_2$ and $Zn_2O_{11}B_6$.

In one embodiment, the nucleating agent is included in an amount of about 0.1 wt % to about 1.0 wt % based on the total weight of the polyarylene sulfide resin composition. When the nucleating agent is included in the above-described amount, there are the effects of shortening the cooling time, making the product moldability better, and shortening the processing time, thus improving the product processing efficiency. If the nucleating agent is included in an amount of less than about 0.1 wt %, it may be difficult to obtain the above effects, and if the nucleating agent is included in an amount of more than about 1.0 wt %, the mechanical strength of the composition of the present disclosure may be reduced. For example, the nucleating agent may be included in an amount of about 0.1 wt % to about 0.8 wt %. In another example, the nucleating agent may be included in an amount of about 0.1 wt % to about 0.5 wt %. For example, the nucleating agent may be included in an amount of about 0.1, 0.2, 0.3, 0.4, 0.5, 0.6, 0.7, 0.8, 0.9 or 1.0 wt %.

Metal Powder

The metal powder may prevent the thermal decomposition of polymer chains of the resin composition under high-temperature processing conditions, and suppress gas from being formed by generated byproducts, thereby improving the heat resistance and mechanical strength characteristics of the composition. The metal powder does not cause corrosion of a metal mold during injection molding of the resin composition, making continuous injection molding possible.

In one embodiment, the metal powder may include one or more transition metals selected from among copper (Cu), nickel (Ni), titanium (Ti), palladium (Pd), chromium (Cr), gold (Au), zinc (Zn), iron (Fe), molybdenum (Mo), cobalt (Co), silver (Ag) and platinum (Pt). Specifically, the metal powder may include one or more of copper, nickel, titanium, zinc, chrome and gold.

In one embodiment, the metal powder may have an average diameter of about 0.1 μm to about 10 μm. For example, the metal powder may have a spherical shape, a flake shape, an amorphous form, or a mixture thereof. Specifically, the metal powder may have an average diameter of about 1 μm to about 10 μm, for example, about 1 μm to about 8 μm, or about 2 μm to about 8 μm, and may have a spherical shape, a flake shape, an amorphous form, or a mixture thereof.

In one embodiment, the metal powder is included in an amount of about 0.05 wt % to about 1 wt % based on the total weight of the polyarylene sulfide resin composition. When the metal powder is included in an amount within the above range, there are the effects of improving the initial strength and heat resistance strength of the resin composition and reducing the outgas content of the product. If the metal powder is included in an amount of less than about 0.05 wt %, the property of reducing outgas in the injection-molded headlamp component may deteriorate, leading to decreased reliability of the product, and if the metal powder is included in an amount of more than about 1.0 wt %, the mechanical properties and extrusion processability of the composition may deteriorate. For example, the metal powder may be included in an amount of about 0.05 wt % to about 0.8 wt %. As another example, the metal powder may be included in an amount of about 0.1 wt % to about 0.7 wt %. For example, the metal powder may be included in an amount of about 0.05, 0.06, 0.07, 0.08, 0.09, 0.1, 0.2, 0.3, 0.4, 0.5, 0.6, 0.7, 0.8, 0.9 or 1.0 wt %.

Composite Metal Hydroxide

The composite metal hydroxide has the effect of reducing outgas in the resin composition of the present disclosure due to its gas capturing ability to absorb outgas, and at the same time, serves to improve the mechanical properties of the resin composition.

The composite metal hydroxide may include hydrotalcite. The hydrotalcite has a structure in which an anion is fixed between a monovalent metal, a divalent metal, and a mixed metal of a divalent metal and a trivalent metal. For example, the hydrotalcite means a layered double hydroxide having a structure in which, between positively charged layers composed of a mixed metal and a hydroxyl group, an anion balancing the positive charge is fixed. In one embodiment, the hydrotalcite includes a structure represented by the following Formula 1.

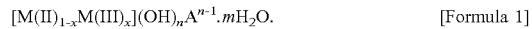

$$[M(II)_{1-x}M(III)_x](OH)_nA^{n-1}.mH_2O. \qquad \text{[Formula 1]}$$

In Formula 1 above, M(II) and M(III) are mixed metal components forming the center of the layers. M(II) is a metal component (or a divalent metal component) that may have an oxidation number of +2, and M(III) is a metal component (or a trivalent metal component) that may have an oxidation number of +3. The (OH) component is a component forming both the upper and lower sides of the mixed metal component, and A is an interlayer anion exchangeable with other anion. x is the fraction of each of the M(II) component and the M(III) component, and the total amount of charge of the hydrotalcite including the structure of Formula 1 is determined according to the fraction value of the M(III) component, and may be 0.20<x<0.33.

In one embodiment, the composite metal hydroxide is included in an amount of about 0.1 wt % to about 3 wt % based on the total weight of the polyarylene sulfide resin composition. When the composite metal hydroxide is included in the above amount, the mechanical properties of the resin composition and the effect of reducing outgas may be excellent. If the composite metal hydroxide is included in an amount of less than about 0.1 wt %, the effect of reducing outgas may be insignificant, and if the composite metal hydroxide is included in an amount of more than about 3 wt %, the miscibility and heat resistance of the composition may be reduced. For example, the composite metal hydroxide may be included in an amount of about 0.5 wt % to about 2 wt %. For example, the composite metal hydroxide may be included in an amount of about 0.1, 0.2, 0.3, 0.4, 0.5, 0.6, 0.7, 0.8, 0.9, 1, 2 or 3 wt %.

In one embodiment, the polyarylene sulfide resin composition may include the metal powder and the composite metal hydroxide at a weight ratio of about 1:1 to about 1:2.5.

When the metal powder and the composite metal hydroxide are included at the above weight ratio, the miscibility and heat resistance of the composition of the present disclosure may be excellent and the effect of reducing outgas may be excellent. For example, the metal powder and the composite metal hydroxide may be included at a weight ratio of about 1:1 to about 1:2.

In one embodiment, the polyarylene sulfide resin composition may include the nucleating agent and the metal powder at a weight ratio of about 1:0.5 to about 1:4. When the nucleating agent and the metal powder are included at the above weight ratio, the miscibility and heat resistance of the composition of the present disclosure may be excellent and the effect of reducing outgas may be excellent. For example, the nucleating agent and the metal powder may be included at a weight ratio of about 1:0.5 to about 1:2.

Compatibilizer

In one embodiment, the polyarylene sulfide resin composition may further include a compatibilizer. The compatibilizer, a property enhancing agent, serves to improve the compatibility between the polyarylene sulfide resin and the inorganic filler, thereby improving the interfacial bonding strength therebetween.

In one embodiment, the compatibilizer may include a silane-based compound. Specifically, the compatibilizer may include one or more of epoxysilanes, mercaptosilanes, and aminosilanes.

The compatibilizer may be a dry silane. The dry silane may be produced by loading a liquid silane into an inorganic material including fine pores.

The content of silane in the dry silane may be about 10 wt % to about 80 wt %, for example, about 20 wt % to about 40 wt %, and as another example, about 50 wt % to about 80 wt %, based on the total weight of the dry silane. The liquid silane may include one or more of epoxysilanes, mercaptosilanes and aminosilanes.

In one embodiment, the compatibilizer may be included in an amount of about 0.1 wt % to about 5 wt % based on the total weight of the polyarylene sulfide resin. For example, the compatibilizer may be included in an amount of about 0.1 wt % to about 1 wt %. As another example, the compatibilizer may be included in an amount of about 0.1 wt % to about 0.8 wt %. As still another example, the compatibilizer may be included in an amount of about 0.3 wt % to about 0.7 wt %. For example, the compatibilizer may be included in an amount of about 0.1, 0.2, 0.3, 0.4, 0.5, 0.6, 0.7, 0.8, 0.9, 1, 2, 3, 4 or 5 wt %.

Additive

In one embodiment, the polyarylene sulfide resin composition may further include one or more additives selected from among lubricants, antistatic agents, dispersing agents and pigments. In one embodiment, the additives may be included in an amount of about 0.01 wt % to about 10 wt % based on the total weight of the polyarylene sulfide resin. For example, the additives may be included in an amount of about 0.01, 0.05, 0.1, 0.2, 0.3, 0.4, 0.5, 0.6, 0.7, 0.8, 0.9, 1, 2, 3, 4, 5, 6, 7, 8, 9 or 10 wt %.

In one embodiment, the polyarylene sulfide resin composition may have a heat distortion temperature (1.82 MPa, 120° C./hr) of about 260° C. or above as measured in accordance with ASTM D 648, an Izod impact strength of about 69 J/m or higher as measured for a 3.2 mm-thick specimen in accordance with ASTM D 256, and a haze of about 5% or less, as measured on a glass plate after performing a fogging test for pellets (15 g) of the polyarylene sulfide resin composition at 230° C. for 5 hours.

For example, the polyarylene sulfide resin composition may have a heat distortion temperature (1.82 MPa, 120° C./hr) of about 260° C. to about 270° C. as measured in accordance with ASTM D 648, an Izod impact strength of about 69 J/m to about 90 J/m as measured for a 3.2 mm-thick specimen in accordance with ASTM D 256, and a haze of about 0% to about 5% or less, as measured on a glass plate after performing a fogging test for pellets (15 g) of the polyarylene sulfide resin composition at 230° C. for 5 hours.

As another example, the polyarylene sulfide resin composition may have a heat distortion temperature of about 260° C. to about 270° C. as measured in accordance with ISO 75, and a Charpy impact strength of about 35 kJ/m$^2$ to about 50 kJ/m$^2$ as measured for a 4.0 mm-thick specimen in accordance with ISO 179.

In one embodiment, the polyarylene sulfide resin composition may have a tensile strength of about 165 MPa or higher as measured in accordance with ASTM D 638, a flexural strength of about 230 MPa or higher as measured in accordance with ASTM D 740, and a flexural modulus of about 11,500 MPa or higher as measured in accordance with ASTM D 740.

For example, the polyarylene sulfide resin composition may have a tensile strength of about 165 MPa to about 200 MPa as measured in accordance with ASTM D 638, a flexural strength of about 230 MPa to about 280 Mpa as measured in accordance with ASTM D 740, and a flexural modulus of about 11,500 MPa to about 16,000 MPa as measured in accordance with ASTM D 740.

As another example, the polyarylene sulfide resin composition may have a tensile strength of about 180 MPa to about 220 MPa as measured in accordance with ISO 527, a flexural strength of about 250 MPa to about 300 MPa as measured in accordance with ISO 178, and a flexural modulus of about 12,600 MPa to about 15,000 MPa as measured in accordance with ISO 178.

The polyarylene sulfide resin composition of the present disclosure may be molded according to a method known in the art, thereby manufacturing the automobile headlamp component. For example, the headlamp component may be manufactured by injection molding, extrusion molding and blow molding of the composition.

Automobile Headlamp Component Manufactured Using Polyarylene Sulfide Resin Composition for Automobile Headlamp Component Still another aspect of the present disclosure is directed to an automobile headlamp component manufactured using the polyarylene sulfide resin composition. In one embodiment, the automobile headlamp component may include a base plate for a headlamp aiming device.

Hereinafter, the configuration and effects of the present disclosure will be described in more detail with reference to preferred examples. However, these examples are presented as preferred examples of the present disclosure and may not be construed as limiting the scope of the present disclosure in any way. The contents that are not described herein can be sufficiently and technically envisioned by those skilled in the art, and thus the description thereof will be omitted herein.

Preparation Example 1

5,130 g of para-diiodobenzene (p-DIB) and 450 g of sulfur were introduced into a reactor equipped with a thermocouple, which is capable of measuring the internal temperature of the reactor, and a vacuum line through which nitrogen can be charged and a vacuum can be applied. Then, the reactor was heated to 180° C., and the p-DIB and the sulfur were completely melted and mixed, thereby preparing a reactant mixture.

Thereafter, the reactant mixture was subjected to stepwise temperature rise and pressure drop from initial reaction conditions of 220° C. and 350 Torr to final reaction conditions of 300° C. and 0.6 to 0.9 Torr Under such conditions, a polymerization reaction was performed while sulfur was introduced seven times in an amount of 19 g each time. The degree of progress of the polymerization reaction was calculated using the equation "(present viscosity/target viscosity)×100%", which indicates the relative ratio of the present viscosity to the target viscosity. The target viscosity was 2,000 poise, and the present viscosity was measured with a viscometer after taking a sample from the reactor where the polymerization reaction was progressing. At the time point where 80 wt % of the diiodo aromatic compound of the reaction mixture has reacted during the polymerization, 35 g of diphenyl sulfide as a polymerization stopping agent was added and reacted for 1 hour. Next, vacuum was applied slowly to a pressure of 0.1 to 0.5 Torr, and after the target viscosity (2,000 poise) was reached, the reaction was terminated, thereby synthesizing a polyphenylene sulfide resin (PPS 1). After completion of the reaction, the resin was prepared into pellets using a small strand cutter.

The produced PPS 1 was measured for its melting point (Tm), number-average molecular weight (Mn), molecular weight distribution (PDI), melt viscosity (MV), and main chain-coupled iodine and free iodine content, according to the following methods.

(1) Melting point: Using a differential scanning calorimeter (DSC), the PPS resin was heated from 30° C. to 320° C. at a rate of 10° C./min, and then cooled to 30° C., and then the melting point of the PPS resin was measured while the resin was heated again from 30° C. to 320° C. at a rate of 10° C./min.

(2) Number-average molecular weight (Mn) and molecular weight distribution (PDI): The PPS resin was added to 1-chloronaphthalene to a concentration of 0.4 wt %, and stirred and dissolved at 250° C. for 25 minutes, thereby preparing a sample. Next, the sample was allowed to flow through a high-temperature gel permeation chromatography (GPC) system (210° C.) at a flow rate of 1 ml/min while polyphenylene sulfides with different molecular weights were sequentially separated in the column. Next, the molecular weight-dependent intensities of the separated polyphenylene sulfides were measured using an RI detector, and a calibration curve was prepared using a standard sample (polystyrene) having an already known molecular weight. Using the calibration curve, the number-average molecular weight (Mn) and molecular weight distribution (PDI) of the produced PPS resin were calculated.

(3) Melt Viscosity (MV): The melt viscosity was measured with a rotating disk viscometer at 300° C. In measurement of the melt viscosity by the frequency sweep method, the angular frequency was measured from 0.6 to 500 rad/s, and the viscosity at 1.84 rad/s was defined as the melt viscosity.

(4) Content (ppm) of main chain-coupled iodine and free iodine: To measure the content (ppm) of main chain-coupled iodine and free iodine, 50 mg of the PPS resin was completely burned at 1,000° C. Then, a sample was prepared using an auto quick furnace (AQF) that ionizes iodine in combustion gas and dissolves the ionized iodine in distilled water. Using a calibration curve obtained by analyzing the sample by ion chromatography, the iodine (I) content of the PPS resin was measured.

(5) Chlorine content (ppm): While 50 mg of the injection-molded sample was humidified using the AQF (Auto Quick Furnace) at 1,000° C., the organic compound of the resin was completely burned. Next, the combustion gas was captured into an absorbing solution (hydrogen peroxide solution 900 ppm), and then automatically injected into ion chromatography (Auto Quick Furnace), followed by measurement of chlorine (Cl) content.

It was shown that the PPS 1 had a melting point of 280° C., a number-average molecular weight (Mn) of 17,420, a molecular weight distribution (PDI) of 2.7, a melt viscosity (Mv) of 2,150 poise, a main chain-coupled iodine and free iodine content of 300 ppm, and a chlorine content of 0 ppm.

Examples and Comparative Examples

The components used in Examples and Comparative Examples are as follows.

(A1) Polyarylene sulfide resin (PPS 1): A polyphenylene sulfide resin (ECOTRAN, INITZ Co., Ltd.) having a chloride content of 300 ppm or less was used.

(A2) Polyarylene sulfide resin (PPS 2): A polyphenylene sulfide resin (0205P4, Celanese) having a chloride content of 2,000 ppm was used.

(B) Inorganic filler: Urethane/aminosilane-treated glass fiber (OCV 910, Owens Corning) having an average diameter of 6 to 15 μm and an average length of 2 to 5 mm was used.

(C) Nucleating agent: A nucleating agent (product name: BRONID-006, 3M) including 0.01 to 0.5 wt % of boron oxide ($B_2O_3$) and 99.5 to 99.99 wt % of boron nitride (BN) was used.

(D) Metal powder: Copper (Cu) powder (particle size: 3.5 μm, flake type, purity: 99% or more) was used.

(E) Composite metal hydroxide: Hydrotalcite (CLC120, DOOBOM) was used.

Examples 1 to 4 and Comparative Examples 1 to 5

The components and contents shown in Table 1 were introduced into a twin-screw extruder (diameter: 40 mm; and L/D=44) and extruded under the conditions of screw speed of 250 rpm and barrel temperature of 280 to 300° C., thereby producing pellet-type polyarylene sulfide resin compositions. The pellets were dried at a temperature of 80 to 100° C., and then injection-molded in an injection molding machine, thereby producing specimens.

TABLE 1

| Components (wt %) | Examples | | | | Comparative Examples | | | | |
|---|---|---|---|---|---|---|---|---|---|
| | 1 | 2 | 3 | 4 | 1 | 2 | 3 | 4 | 5 |
| (A1) | 58.5 | 56.1 | 53.25 | 64.45 | 41.5 | 74.5 | 55 | 59.0 | — |
| (A2) | — | — | — | — | — | — | — | — | 58.5 |
| (B) | 40 | 42 | 45 | 35 | 57 | 24 | 40 | 40 | 40 |

TABLE 1-continued

|  | Examples | | | | Comparative Examples | | | | |
|---|---|---|---|---|---|---|---|---|---|
| Components (wt %) | 1 | 2 | 3 | 4 | 1 | 2 | 3 | 4 | 5 |
| (C) | 0.25 | 0.15 | 0.25 | 0.2 | 0.25 | 0.25 | 1.25 | 0.25 | 0.25 |
| (D) | 0.5 | 0.5 | 0.5 | 0.1 | 0.5 | 0.5 | 1.5 | — | 0.5 |
| (E) | 0.75 | 1.25 | 1.00 | 0.25 | 0.75 | 0.75 | 2.25 | 0.75 | 0.75 |

Evaluation of Physical Properties

For the specimens of Examples 1 to 4 and Comparative Examples 1 to 5 above, the physical properties were evaluated as follows, and the results are shown in Table 2 below.

(1) Heat distortion temperature (° C.): Heat distortion temperature was measured in accordance with ASTM D 648 under conditions of 1.82 MPa and 120° C./hr.

(2) Impact strength (J/m): Impact strength was measured for a 3.2 mm-thick specimen of each of the Examples and the Comparative Examples in accordance with ASTM D 256.

(3) Tensile strength (MPa): Tensile strength was measured in accordance with ASTM D 638.

(4) Flexural strength (MPa) and flexural modulus (MPa): Flexural strength and flexural modulus were measured in accordance with ASTM D 740.

(5) Haze: The haze on a glass plate after performing a fogging test for pellets (15 g) of each of the Examples and the Comparative Examples at 230° C. for 5 hours was measured.

(6) Injection moldability: A base plate-simulating mold was fabricated, and each of the Examples and the Comparative Examples was injection-molded using the mold in an injection molding machine (mold clamping force: 80 ton). The appearance completeness of the product was examined.
* Simulating mold (mold size (mm) and product weight (g)): 560×550×461 (H), 185 g (except runner)

TABLE 2

| | Examples | | | | Comparative Examples | | | | |
|---|---|---|---|---|---|---|---|---|---|
| Properties | 1 | 2 | 3 | 4 | 1 | 2 | 3 | 4 | 5 |
| Heat distortion temperature (° C.) | 266 | 265 | 266 | 260 | 270 | 258 | 263 | 263 | 265 |
| Impact strength (J/m) | 90 | 84 | 88 | 80 | 80 | 64 | 75 | 64 | 88 |
| Tensile strength (MPa) | 181 | 175 | 178 | 166 | 171 | 150 | 160 | 164 | 179 |
| Flexural strength (MPa) | 271 | 263 | 266 | 232 | 265 | 215 | 235 | 240 | 266 |
| Flexural modulus (GPa) | 13.8 | 13.9 | 14.1 | 11.9 | 14.5 | 9.8 | 12.2 | 12.8 | 13.7 |
| Haze (%) | 3.6 | 3.1 | 3.4 | 3.8 | 3.4 | 5.3 | 4.0 | 15.4 | 30.4 |
| Injection moldability | Good | Good | Good | Good | Short shot | Good | Good | Good | Good |

Referring to the results in Table 2 above, it could be seen that Examples 1 to 4 according to the present disclosure showed excellent mechanical properties compared to Comparative Examples 1 to 5, and showed excellent anti-haze performance by minimizing the generation of outgas at high temperature.

In addition, from the results in Table 2 above, it was confirmed that Comparative Example 1 showed excellent mechanical strength, but did not satisfy injection moldability under the same conditions as short shots occurred during injection molding.

(7) Evaluation of Reliability

Among the Examples and the Comparative Examples, Examples 1 to 4 were typically used to manufacture automobile headlamp components (base plates), respectively.

For the headlamp components, reliability evaluation was performed as follows, and the results are shown in Table 3 below.

(7-1) Thermal cycling resistance: Evaluation of the thermal cycling resistance of the specimen of each of the Examples was performed for 5 cycles, each consisting of keeping at 80±2° C. for 3 hours→keeping at room temperature for 1 hour→keeping at −40±2° C. for 3 hours→keeping at room temperature for 1 hour→keeping at 50±2° C. and a relative humidity of 90% RH for 7 hours→keeping at room temperature for 1 hour, and then whether or not the discoloration, fading, swelling, cracking or gloss reduction of the headlamp module would occur was evaluated by visual evaluation. When no discoloration, fading, swelling, cracking or gloss reduction of the headlamp module of the specimen was observed, the specimen was judged as OK.

(7-2) Moisture resistance: The specimens of the Examples were kept in a constant temperature/constant humidity chamber at 50±2° C. and a relative humidity of 95±2% RH for 240 hours, and then whether the surface gloss of each of the specimens would decrease was checked. Specifically, when the specimen satisfied a color difference (ΔE*) of 3.0 or less and a gray scale of grade 4 or more, the specimen was judged as OK.

(7-3) The specimen of each of the Examples was kept at 110° C. for 300 hours, and then whether the discoloration, fading, cracking or gloss reduction of the specimen would occur was checked. Specifically, when the specimen satisfied a color difference (ΔE*) of 3.0 or less and a gray scale of grade 4 or more, the specimen was judged as OK.

TABLE 3

| | Examples | | | |
|---|---|---|---|---|
| Properties | 1 | 2 | 3 | 4 |
| Thermal cyclic resistance | OK | OK | OK | OK |
| Moisture resistance | OK | OK | OK | OK |
| Heat resistance | OK | OK | OK | OK |

Referring to the results in Table 3 above, it could be seen that the specimens of Examples 1 to 4 of the present disclosure had excellent thermal cycling resistance, moisture resistance and heat resistance.

(8) Evaluation of anti-haze performance: A headlamp component specimen including the base plate of Example 1 among the Examples and the Comparative Examples was manufactured. The specimen of Example 1 and a conventionally mass-produced headlamp component specimen (Comparative Example 6) were tested under the conditions shown in Table 4 below, and then the area of haze generated on a headlamp lens for each specimen was measured. The results of the measurement are shown in Table 5 below and FIG. 2.

TABLE 4

| Function | Lighting conditions | Temperature | Wind speed | Testing voltage | Test period |
|---|---|---|---|---|---|
| Low beam | Continuous lighting | Front 23° C. Rear 70° C. | 1.5 m/sec (lens surface) | 13.2 V | 72 hours |
| High beam | 5 hr ON/ 5 min OFF | | | | |
| P_TION | Continuous lighting | | | | |
| T_SIG | 30 min ON/ 5 min OFF | | | | |

TABLE 5

| | Area of haze generated (cm³) | Area of haze generated (vol %) |
|---|---|---|
| Example 1 | 281.5 | 33.4 |
| Comparative Example 6 | 435.1 | 49.8 |

Figure 2:
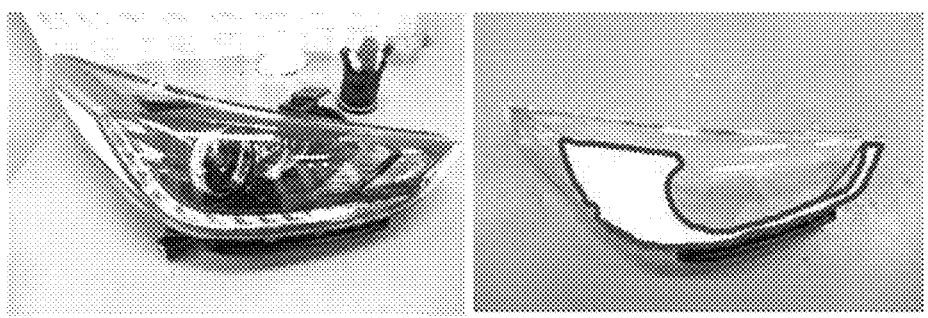
FIG. 2 depicts photographs showing the results of a test performed to evaluate the occurrence of haze in automobile headlamps of an Example according to the present disclosure and a Comparative Example for the present disclosure.
Figure 2:
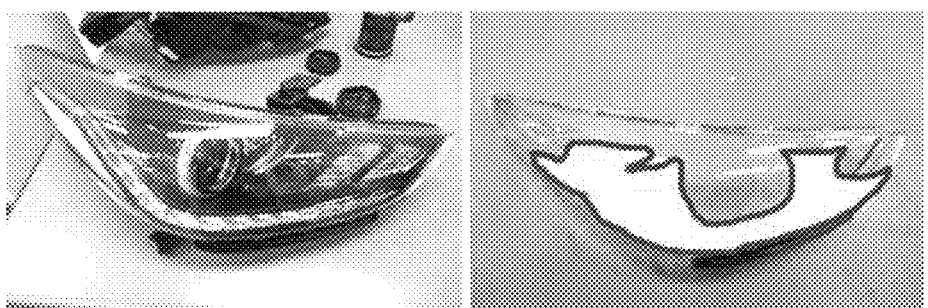

FIG. 2 depicts photographs showing the results of a test performed to evaluate the generation of haze in the automobile headlamps of Example 1 according to the present disclosure and Comparative Example 6 for the present disclosure. Referring to the results in Table 5 above and FIG. 2, it could be seen that the amount of haze generated in Example 1 of the present disclosure was smaller than that in Comparative Example 6.

Simple modifications or variations of the present disclosure may be easily carried out by those skilled in the art, and all such modifications or variations can be considered included in the scope of the present disclosure.

What is claimed is:

1. A polyarylene sulfide resin composition for an automobile headlamp component, comprising:
   about 45 wt % to about 75 wt % of a polyarylene sulfide resin having about 300 ppm or less of chlorine;
   about 24.5 wt % to about 55 wt % of an inorganic filler;
   about 0.1 wt % to about 1 wt % of a nucleating agent;
   about 0.05 wt % to about 1 wt % of a metal powder having particles with an average diameter of about 0.1 µm to about 10 µm and comprising one or more of copper, nickel, titanium, palladium, chromium, gold, zinc, iron, molybdenum, cobalt, silver or platinum; and
   about 0.1 wt % to about 2.5 wt % of a composite metal hydroxide.

2. The polyarylene sulfide resin composition of claim 1, wherein the polyarylene sulfide resin is made by the steps of:
   polymerizing reactants including a diiodo aromatic compound and a sulfur compound; and
   adding a polymerization stopping agent to the reactants at a time point where about 70 wt % or more of the diiodo aromatic compound of the reactants has reacted during the polymerizing.

3. The polyarylene sulfide resin composition of claim 2, wherein polymerizing is performed under initial reaction conditions of a temperature of about 180° C. to about 250° C. and a pressure of about 50 torr to about 450 torr, and then under final reaction conditions of a temperature of about 270° C. to about 350° C. and a pressure of about 0.001 torr to about 20 torr, which are obtained by performing temperature rise and pressure drop from the initial reaction conditions.

4. The polyarylene sulfide resin composition of claim 1, wherein the polyarylene sulfide resin has a melting point of about 265° C. to about 290° C., a number-average molecular weight of about 5,000 to about 50,000, and a melt viscosity of about 10 poise to about 50,000 poise, as measured with a rotating disk viscometer at 300° C.

5. The polyarylene sulfide resin composition of claim 1, wherein the polyarylene sulfide resin comprises about 10 ppm to about 10,000 ppm of one or more of 1) iodine present as an arylene substituent of the resin and 2) free iodine.

6. The polyarylene sulfide resin composition of claim 1, wherein the inorganic filler comprises fibers having an average diameter of about 6 µm to about 15 µm and an average length of about 2 mm to about 5 mm.

7. The polyarylene sulfide resin composition of claim 1, wherein the nucleating agent comprises one or more of borate, boron sulfide, boron chloride, boric acid, colemanite, one or more zinc borate compounds, boron carbide, boron nitride, and boron oxide.

8. The polyarylene sulfide resin composition of claim 1, wherein the composite metal hydroxide comprises hydrotalcite.

9. The polyarylene sulfide resin composition of claim 1, further comprising, based on a total weight of the polyarylene sulfide resin composition, about 0.1 wt % to about 5 wt % of a compatibilizer.

10. The polyarylene sulfide resin composition of claim 1, wherein the polyarylene sulfide resin composition has a metal powder to composite metal hydroxide weight ratio of about 1:1 to about 1:2.5.

11. The polyarylene sulfide resin composition of claim 1, wherein the polyarylene sulfide resin composition has a heat distortion temperature (1.82 MPa, 120° C./hr) of about 260° C. or above as measured in accordance with ASTM D 648, an Izod impact strength of about 69 J/m or higher as measured for a 3.2 mm-thick specimen in accordance with ASTM D 256, and a haze of about 5% or less, as measured on a glass plate after performing a fogging test for pellets (15 g) of the polyarylene sulfide resin composition at 230° C. for 5 hours.

12. The polyarylene sulfide resin composition of claim 1, wherein the polyarylene sulfide resin composition has a tensile strength of about 165 MPa or higher as measured in accordance with ASTM D 638, a flexural strength of about 230 MPa or higher as measured in accordance with ASTM D 740, and a flexural modulus of about 11,500 MPa or higher as measured in accordance with ASTM D 740.

13. An automobile headlamp component comprising the polyarylene sulfide resin composition of claim 1.

14. The automobile headlamp component of claim 13, wherein the automobile headlamp component comprises a base plate.

15. An automobile headlamp comprising the polyarylene sulfide resin composition of claim 1.

16. An automobile headlamp comprising a base plate, comprising the polyarylene sulfide resin composition of claim 1.

17. The polyarylene sulfide resin composition of claim 1, wherein the polyarylene sulfide resin composition comprises:
- 45 wt % to 75 wt % of a polyarylene sulfide resin having 300 ppm or less of chlorine;
- 24.5 wt % to 55 wt % of an inorganic filler;
- 0.1 wt % to 1 wt % of a nucleating agent;
- 0.05 wt % to 1 wt % of metal powder; and
- 0.1 wt % to 2.5 wt % of a composite metal hydroxide.

18. The polyarylene sulfide resin composition of claim 1, further comprising, based on a total weight of the polyarylene sulfide resin composition, 0.1 wt % to 5 wt % of a compatibilizer.

19. The polyarylene sulfide resin composition of claim 1, wherein the polyarylene sulfide resin composition has a metal powder to composite metal hydroxide weight ratio of 1:1 to 1:2.5.

20. The polyarylene sulfide resin composition of claim 1, wherein the metal powder comprises one or more of nickel, zinc, chromium or gold.

\* \* \* \* \*